United States Patent [19]
Van Erden et al.

[11] Patent Number: 5,525,287
[45] Date of Patent: Jun. 11, 1996

[54] METHOD FOR PRODUCING ORIENTED PLASTIC STRAP

[75] Inventors: Donald L. Van Erden, Wildwood; Manuel C. Enriquez, Morton Grove; Hans Weitekamper, Lincolnshire, all of Ill.

[73] Assignee: Signode Corporation, Glenview, Ill.

[21] Appl. No.: 353,721

[22] Filed: Dec. 12, 1994

Related U.S. Application Data

[63] Continuation-in-part of Ser. No. 958,803, Oct. 9, 1992, Pat. No. 5,387,388.

[51] Int. Cl.$^6$ ............................ B29C 35/10; B29C 43/22; B29C 47/00
[52] U.S. Cl. .................... 264/476.000; 264/177.16; 264/177.17; 264/177.19; 264/210.1; 264/280; 264/288.4; 264/481
[58] Field of Search ................................ 264/25, 177.16, 264/177.17, 177.19, 210.1, 280, 288.4, 476, 481

[56] References Cited

U.S. PATENT DOCUMENTS

| | | | |
|---|---|---|---|
| 3,083,410 | 4/1963 | McGlamery | 264/280 |
| 3,290,420 | 12/1966 | Orser | 264/280 X |
| 3,351,697 | 11/1967 | Hufnagel et al. | 264/288.4 |
| 3,354,023 | 11/1967 | Dunnington et al. | 264/175 X |
| 3,376,601 | 4/1968 | Seanor et al. | 425/143 X |
| 3,394,045 | 7/1968 | Gould . | |
| 3,619,460 | 11/1971 | Chill | 264/288.4 |
| 3,651,196 | 3/1972 | Starkweather, Jr. | 264/280 X |
| 4,408,974 | 10/1983 | Comerio | 264/288.4 X |
| 4,428,720 | 1/1984 | Van Erden et al. | 425/66 |
| 5,049,347 | 9/1991 | Magill et al. | 264/280 |

OTHER PUBLICATIONS

Tadmor, Z et al. Principles of Polymer Processing, New York, John Wiley & Sons (1979), pp. 363–372, 442–447, 661–663.

*Primary Examiner*—Leo B. Tentoni
*Attorney, Agent, or Firm*—Schwartz & Weinrieb

[57] ABSTRACT

An apparatus and method for producing an oriented plastic strap having a predetermined desired thickness for use in connection with the strapping of packages or the like, is disclosed. A sheet workpiece is conducted into a nip defined between a pair of milling and stretching rollers wherein one of the rollers is rotated at a lineal surface velocity which is greater than the lineal surface velocity of the other roller, and the rollers are rotated in opposite directions. One of the rollers effectively brakes or retards one of the surfaces of the sheet workpiece while the other one of the rollers effectively accelerates the other one of the surfaces of the sheet workpiece as the workpiece passes through the nip defined between the rollers whereby the workpiece is simultaneously milled and stretched. Additional heating is provided in connection with the surface of the sheet workpiece which is exposed to the ambient air prior to entry of the workpiece into the nip defined between the pair of rollers such that both surfaces will have similar temperature levels so as to exhibit similar density properties, and still further, the edge portions of the sheet workpiece are also heated so as to advantageously control the degree of flatness of the sheet material or workpiece across the width thereof. The flatness quality of the sheet workpiece can also be achieved through means of specially contoured milling rollers defining the zero gap assembly nip, or by means of specially contoured extrusion dies, whereby the edge portions are rendered thinner as compared to the central portion of the sheet workpiece such that upon milling and stretching of the workpiece, which operations tend to thicken the edge portions of the sheet workpiece, the edge portions will exhibit thickness dimensions commensurate with the thickness dimension of the central portion of the sheet workpiece.

28 Claims, 4 Drawing Sheets

METHOD FOR PRODUCING ORIENTED PLASTIC STRAP

CROSS-REFERENCE TO RELATED PATENT APPLICATIONS

This patent application is a Continuation-In-Part (CIP) of U.S. patent application Ser. No. 07/958,803 filed on Oct. 9, 1992 by Donald L. Van Erden et al. and entitled METHOD AND APPARATUS FOR PRODUCING ORIENTED PLASTIC STRAP, now U.S. Pat. No. 5,387,388.

FIELD OF THE INVENTION

The present invention relates generally to a method and apparatus for producing an oriented plastic strap, and a strap produced by such method and apparatus, and more particularly to a method and apparatus for simultaneously milling and stretching a plastic sheet into strap stock material having a predetermined desired thickness.

BACKGROUND OF THE INVENTION

In accordance with a typical prior art stretching process, such as, for example, the SIGNODE process, a cast sheet of thermoplastic material, such as, for example, polypropylene, is first reduced in size, that is, the thickness dimension thereof, by rolling the sheet through a pair of closely spaced milling rollers or cylinders which rotate in opposite directions. After the thickness of the sheet has been reduced, the sheet is then drawn and stretched out from the milling rollers by means of a series of orienting rollers or a bridle assembly so as to achieve its finalized desired size or thickness.

Another prior art process or method that is commonly used in connection with the fabrication of stretched sheet materials is a process known as or called the short-gap method and is generally comprised of an entry bridle, a stretching assembly, and an exit bridle. In accordance with this process, a slow speed, heated entry bridle assembly advances a cast sheet of material, usually film, to a stretching assembly which comprises a pair of rollers or cylinders which are set a predetermined distance apart. The first roller rotates at the same speed as the entry bridle, whereas the second roller rotates at a speed which is greater than that of the first roller and which is equal to the rotary speed of the exit bridle. Thus, as the film passes through the entire assembly, it is stretched to its finalized desired size or thickness dimension.

These prior art methods or processes present several disadvantages. For example, the properties of the straps produced by these methods or processes provide or exhibit limited increases in strength without significant increases in other desired properties. In addition, substantial necking of the sheets occur as the sheets are stretched over the distance or space defined between the rollers.

The aforenoted parent patent application presented, disclosed, and embodied a novel process and apparatus for achieving the simultaneous milling and stretching of such sheets whereby the aforenoted problems were minimized, however, other operational problems with such process and apparatus have now been discovered which require rectification in order to achieve still better properties characteristic of such simultaneously milled and stretched sheets of thermoplastic material. For example, one operational problem or deficiency which has been discovered in connection with the fabrication or manufacture of the simultaneously milled and stretched sheets of thermoplastic material in accordance with the zero-gap process and apparatus set forth and described within the aforenoted parent patent application is that when the thermoplastic sheet is ready to be worked, that is, simultaneously milled and stretched, by being conducted through the nip defined between the oppositely rotating rollers of the zero-gap assembly, it has been found that the opposite surfaces of the thermoplastic sheet exhibit different surface temperature values. This is because as the thermoplastic sheet is routed about the first or upstream roller of the zero-gap roller assembly, the inside surface of the thermoplastic sheet, that is, the surface of the sheet which is in direct contact with the first or upstream roller of the roller assembly, will be heated by the first or upstream roller, or at least have its surface effectively prevented from being cooled by the ambient air because such surface is disposed in direct contact with the first or upstream roller and not exposed directly to the ambient air. On the contrary, the outer or exterior surface of the thermoplastic sheet, that is, the surface of the sheet which is not disposed in direct contact with the first or upstream roller, is effectively cooled as a result of being exposed to the ambient air. Such temperature differential between the aforenoted surfaces of the thermoplastic sheet leads to density differentials throughout the thermoplastic sheet which adversely affects the various properties of the processed sheets, such as, for example, the tensile strength, weldability and associated properties, and split resistance.

Another problem or deficiency which has been discovered in connection with the aforenoted zero-gap simultaneous milling and stretching apparatus and method is that as a result of the processing of the thermoplastic sheet, the opposite edge portions of the sheet become thickened, or in other words, the sheet does not exhibit uniform thickness or flatness across the width thereof. Consequently, when the processed sheet is subsequently desired to be processed further into thermoplastic strapping, the thickened edge portions cannot be used to fabricate such straps, at least without further processing in order to effectively reduce the thickness dimension to the desired thickness dimension characteristic of the useable strapping. Consequently, it is desired to laterally extend or increase the width of the zone or region of the processed sheet which exhibits the uniform thickness dimension or flatness of the sheet so as to effectively increase the amount of processed sheet which can then be readily fabricated into the desired strapping.

OBJECTS OF THE INVENTION

Accordingly, it is an object of the present invention to provide a new and improved method and apparatus for producing oriented plastic strap, and an oriented plastic strap produced by such method and apparatus.

Another object of the present invention is to provide a new and improved method and apparatus for producing oriented plastic strap, and an oriented plastic strap produced by such method and apparatus, which overcomes the various disadvantages, problems, and deficiencies of the prior art processes and apparatus.

Yet another object of the present invention is to provide a new and improved method and apparatus for producing oriented plastic strap which is capable of simultaneously milling and stretching a sheet workpiece into a strap which has a predetermined thickness dimension as a result of the sheet workpiece being conducted in a single pass through a nip defined between a pair of zero-gap rollers.

Still another object of the present invention is to provide a new and improved method and apparatus for producing oriented plastic strap, and an oriented plastic strap produced by such method and apparatus, which has significantly increased tensile strength and split resistance when compared to straps produced by heretofore known prior art methods and apparatus.

A further object of the present invention is to provide a new and improved method and apparatus for producing oriented plastic strap, and an oriented plastic strap produced by such method and apparatus, which exhibits high tensile strength, high split resistance, and improved welding characteristics.

A yet further object of the present invention is to provide a new and improved method and apparatus for producing oriented plastic strap, and an oriented plastic strap produced by such method and apparatus, wherein uniform density characteristics are imparted to the sheet workpiece such that the milled and stretched strap produced within the zero-gap roller assembly exhibits improved tensile strength, weld, and split resistance properties.

A still further object of the present invention is to provide a new and improved method and apparatus for producing oriented plastic strap, and an oriented plastic strap produced by such method and apparatus, wherein improved uniform thickness and flatness characteristics are imparted to the finalized milled and stretched strap as a result of various heating, rolling, and extrusion techniques being imparted to the original sheet workpiece or material.

SUMMARY OF THE INVENTION

Briefly, the foregoing and other objects are achieved in accordance with the present invention through the provision of a method and apparatus for producing an oriented plastic strap which will have a predetermined desired thickness for use in strapping packages and the like wherein the strap, having the noted predetermined desired thickness, is simultaneously milled and stretched as a result of a plastic sheet workpiece being passed through a nip defined between a pair of rollers or cylinders which are spaced closely together with respect to each other. The nip has a space dimension which is substantially less than the original thickness dimension of the sheet workpiece, and the rollers are rotated in opposite directions and at substantially different lineal surface velocities.

In order to improve the various properties of the simultaneously milled and stretched strap, the density of the sheet workpiece, prior to entry into the aforenoted nip defined between the pair of milling rollers, is rendered more uniform across the thickness of the sheet workpiece by heating the outer surface of the sheet workpiece to an elevated temperature, that is, to a temperature level which is greater than that of the inner surface of the sheet workpiece which is disposed in contact with one of the milling rollers, such that despite the cooling of the outer surface of the sheet workpiece as a result of the exposure of the outer surface of the sheet workpiece to the ambient air, the inner and outer surfaces will exhibit substantially the same temperature levels and therefore substantially uniform densities.

In order to improve the flatness of the resultant simultaneously milled and stretched sheet such that increased volumetric strapping can be produced from such sheeting, edge heaters are disposed along the opposite edge regions of the sheet workpiece prior to entry of the sheet workpiece into the nip defined between the zero-gap milling rollers. Such edge heating has been found to significantly reduce the width of thickened edge portions of the milled and stretched sheet, as measured inwardly from the edge portions of the sheet, such that an increased amount of useable sheet can be produced while concomitantly resulting in reduced amount of sheeting which must be trimmed and discarded.

Another manner in which increased flatness of the milled and stretched sheeting can be achieved is to initially impart to the sheet workpiece, either upstream or prior to entry of the sheet workpiece into the nip defined between the mill rollers, or within the nip defined between the miller rollers, thinner edge portions. Consequently, in view of the tendency of the edge portions of the workpiece to become thickened as a result of the simultaneous milling and stretching of the sheet workpiece, the edge portions will exhibit thickness dimensions which will be commensurate with the thickness dimension of the central portion of the sheet workpiece, as viewed transversely across the width of the sheet workpiece, when the sheet workpiece is simultaneously milled and stretched. Production of the thinner edge portions of the sheet workpiece can be produced, for example, by means of specially contoured milling rollers employed within the zero-gap system or assembly defining the nip through which the sheet workpiece is forced to pass, the zero-gap mill rollers effectively defining a nip therebetween which has a trapezoidal cross-sectional configuration. In a similar manner, and in accordance with a second means or mode for producing thinner edge portions upon the sheet workpiece, specially contoured extrusion dies and casting rollers can be employed so as to similarly provide the extruded and cast sheet workpiece with a substantially trapezoidal configuration such that the edge portions of the sheet workpiece are tapered. As a result of the simultaneously milling and stretching of the sheet workpiece, the tapered edge portions thereof will experience increased thickening whereby, as a result, the thickness dimensions of the edge portions will become similar to the thickness dimension of the central portion of the sheet workpiece.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein.

DETAILED DESCRIPTION OF THE ILLUSTRATED EMBODIMENTS

Figure 1:
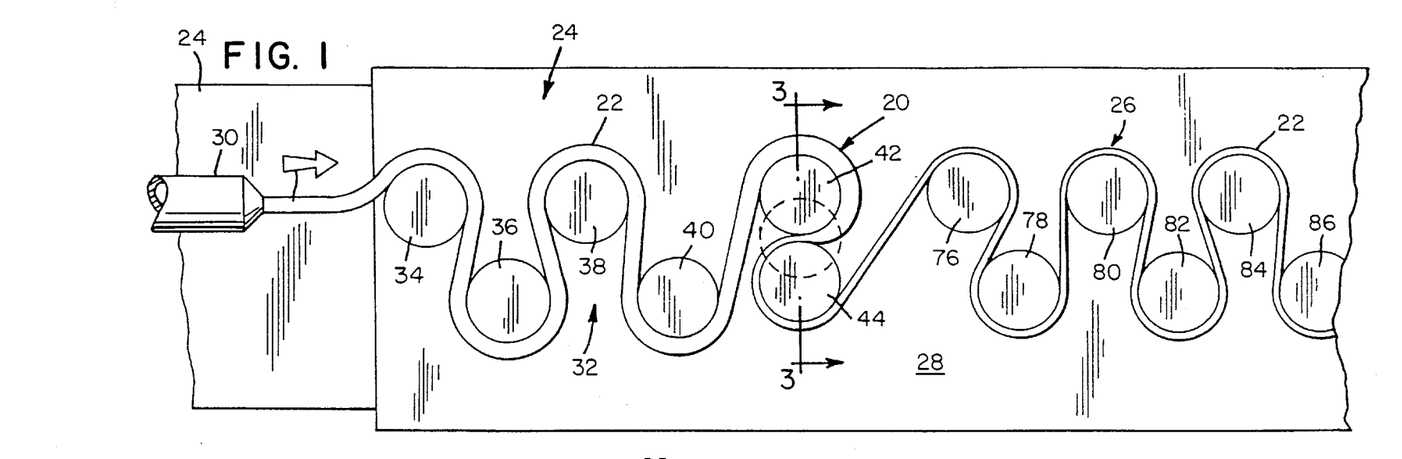
FIG. 1 is a fragmentary front view of apparatus, constructed in accordance with the present invention, for producing oriented plastic strap in accordance with the zero-gap manufacturing process of the present invention.

Referring now to the drawings, and more particularly to FIG. 1 thereof, there is schematically illustrated a zero-gap roller assembly, generally indicated by the reference character 20, for simultaneously milling and stretching or elongating a sheet workpiece 22 into a thin strap stock material. The present invention is discussed and illustrated with only a single sheet workpiece 22 being conducted through the assembly 20, however, it is to be understood that more than one sheet or workpiece 22 may be simultaneously passed through the assembly 20. It is to be further noted that the phrase or terminology "zero-gap" as used throughout this patent application refers to the concept of substantially eliminating any gap between the step of milling the sheet workpiece and the step of stretching the sheet workpiece. In other words, the steps of milling and stretching of the sheet workpiece are accomplished substantially simultaneously. In addition, it is noted, as disclosed in FIG. 1, that the zero-gap assembly 20 is located between a sheet or workpiece feeding assembly 24 and an exit bridle assembly 26 which are located or mounted upon a frame or support 28.

The feeding assembly 24 may take any one of several forms, and as shown in FIG. 1, comprises an extruding machine 30 for extruding a sheet or workpiece 22 of stock material, and an entry bridle assembly 32. The extruding machine 30 produces a sheet workpiece 22 from a suitable material, such as, for example, polypropylene or the like, and the sheet workpiece 22 is conducted into the entry bridle assembly 32 which, in turn, feeds the sheet workpiece into the zero-gap roller assembly 20. The sheet workpiece 22 may be heated during its passage through the entry bridle assembly 32 so as to in effect be pre-heated upon entry into the zero-gap assembly 20 in order to enhance the working properties of the material comprising the sheet workpiece 22.

The entry bridle assembly 32 is seen to comprise a plurality of rollers or cylinders 34, 36, 38, and 40 which are mounted by suitable means, such as, for example, shafts, not shown, upon the frame or support 28. The rollers 34, 36, 38, and 40 may be either solid or hollow, and in the preferred embodiment, as illustrated in FIG. 1, the rollers 34, 36, 38, and 40 are essentially only used to properly deliver or feed the sheet workpiece 22 into the zero-gap assembly 20, and they do not substantially contribute to any stretching or milling of the sheet workpiece 22. A different number of rollers may be employed than that shown in FIG. 1, and it is seen that the rollers 34, 36, 38, and 40 are arranged within two vertically spaced rows with the bottom row rollers 36 and 40 being located between or offset with respect to the top row rollers 34 and 38. Rollers 34 and 38 are also mounted for rotation in the clockwise direction while rollers 36 and 40 are mounted for rotation in the counterclockwise direction, whereby when the sheet workpiece 22 is wound around or routed through the entry bridle assembly 32, it travels through the rollers 34, 36, 38, and 40 in the proper mode or direction with respect to the directions of rotation of the rollers 34, 36, 38, and 40. Each one of the rollers 34, 36, 38, and 40 are rotated at a uniform speed by suitable means, not shown, such as, for example, a motor and shaft drive assembly, and all of the rollers 34, 36, 38, and 40 rotate at substantially the same speed or lineal surface velocity as the top roller 42 of the zero-gap assembly 20, which will be discussed in greater detail hereinafter.

Figure 7A:
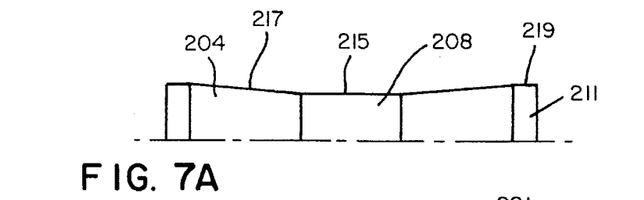
FIGS. 7A and 7B are front views of two different embodiments of milling rollers which can be used within the zero-gap assembly of either FIGS. 1 or 5 so as to produce milled and stretched plastic strap which has thinner edge portions such that the amount of useable sheeting exhibiting the desired degree of flatness, as viewed in the transverse direction across the width of the sheeting, is enhanced.
Figure 7B:
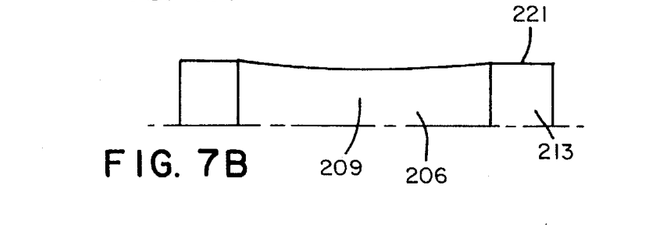

Continuing further, after the sheet workpiece 22 passes through the feeding assembly 24, it advances toward the zero-gap assembly 20 for simultaneous milling and stretching into a finished sheet 22 which has a predetermined desired thickness. The zero-gap assembly 20 comprises a pair of rollers or cylinders 42 and 44 that are rotatably mounted in an opposing relationship. The nip 46, that is, the distance defined between the rollers 42 and 44, can be substantially varied depending upon the desired finished thickness of the finished sheet 22. The zero-gap rollers 42 and 44 may either be solid or hollow, and may be heated by any well-known means, not shown, such as, for example, circulating a heated fluid through the rollers 42 and 44, in order to enhance the stretching properties of the sheet material. The zero gap rollers 42 and 44 may also be flat, as shown in FIGS. 1–4, or may be contoured, as shown in FIGS. 7A and 7B, in order to change the shape of the sheet workpiece 22 as it passes through the rollers 42 and 44 of the zero-gap assembly 20, as will be more fully discussed hereinafter.

Figure 2:
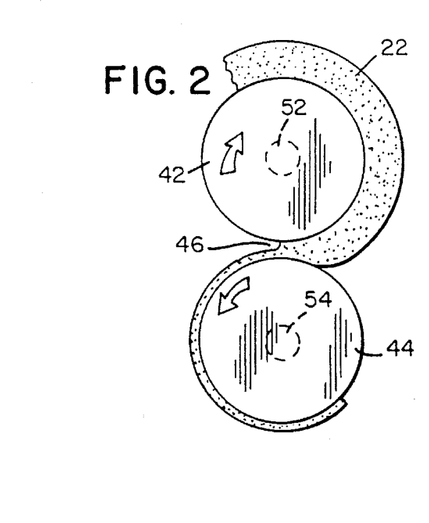
FIG. 2 is an enlarged, simplified, fragmentary front view of the milling and stretching rollers defining the zero-gap assembly of FIG. 1.
Figure 3:
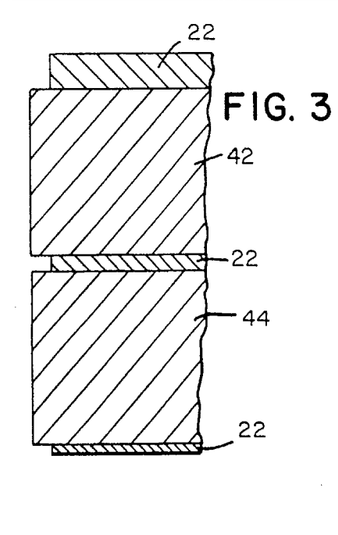
FIG. 3 is an enlarged, partial, cross-sectional view of the milling and stretching rollers defining the zero-gap assembly of FIG. 1 as taken along the line 3—3 of FIG. 1.

As best shown in FIG. 2, the upper roller 42 is driven in a clockwise direction, as shown by means of its arrow, and the bottom or lower roller 44 is driven in the counterclockwise direction as similarly shown by means of its arrow. Thus, the sheet workpiece 22 is first routed around a major circumferential portion of the top or upper roller 42, the workpiece 22 is then conducted through the nip 46 defined between the rollers 42 and 44, and is then conducted around a major circumferential portion of the bottom or lower roller 44. More particularly, it is appreciated that the sheet workpiece 22 is disposed in surface contact with each one of the rollers 42 and 44 over a circumferential extent which is greater than one-half of each of the circumferential dimensions of each one of the rollers 42 and 44, and it is further noted that as a result of this particular routing of the sheet workpiece 22 through the nip 46 defined between the rollers 42 and 44, and about the outer circumferential or peripheral surfaces of the rollers 42 and 44, each roller 42 and 44 is disposed in contact with an opposite surface or side of the sheet workpiece 22.

In accordance with the preferred, illustrated embodiment of the present invention, as shown in FIGS. 1–4, and as has been described in detail, the milling and stretching rollers 42 and 44 of the zero-gap assembly 20 are disposed in a top-bottom or upper-lower arrangement with respect to each other, however, it is to be appreciated that the rollers 42 and 44 may alternatively be disposed in a side-by-side arrangement in which case the top or upper roller 42 will be disposed toward the left of the bottom or lower roller 44 such that the roller 42 will be the first roller that the sheet workpiece 22 contacts while the bottom or lower roller 44, which is now, in effect, the right roller, will be the second roller that the sheet workpiece 22 contacts. As best seen in FIG. 2, the rollers 42 and 44 are respectively mounted upon rotary shafts or axles 52 and 54.

Figure 4:
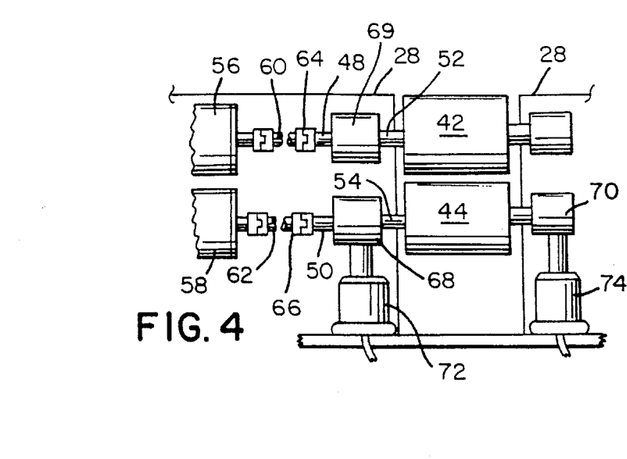
FIG. 4 is a simplified, fragmentary cross-sectional view, on a reduced scale, of the milling and stretching rollers defining the zero-gap assembly of FIG. 1, as taken along a line or direction parallel to line 3—3 of FIG. 1.

With particular reference being made to FIG. 4, the drive system for the rollers 42 and 44 is disclosed therein, and it is seen that the axles or shafts 52 and 54 of the rollers 42 and 44 are operatively connected, through means of bearings 69 and 68, to driven shafts 48 and 50. Suitable drive means 56 and 58, such as, for example, electric motors, are mounted upon the support 28 and drive the rollers 42 and 44, respectively, through means of drive shafts 60 and 62 which are connected to the shafts 48 and 50 by means of suitable couplings 64 and 66, coupling 66 preferably comprising a universal coupling for reasons to become apparent shortly. The bottom or lower roller 44 is connected to the support 28 through means of bearings 68 and 70, and the coupling 66, and bearings 68 and 70, permit the bottom or lower roller 44 to move with respect to the support 28 by means of actuators 72 and 74. In this manner, the bottom or lower roller 44 is able to be moved toward or away from the stationary top or upper roller 42 so as to desirably change the size of the nip 46 defined between the rollers 42 and 44. Each one of the driven shafts 48 and 50 is independently driven by its separate drive means 56 and 58, and the bottom or lower roller 44 is driven at a speed greater than that of the top or upper roller 42. In particular, in accordance with the teachings of the present invention, the lower or bottom roller 44 is driven in such a manner that its lineal surface velocity is preferably within the range of seven to twelve (7–12) times greater than the lineal surface velocity of the top or upper roller 42.

In view of the foregoing, it can therefore be appreciated that as the sheet workpiece 22 is passed through the nip 46 defined between the upper and lower rollers 42 and 44 of the zero-gap assembly 20, the top or upper roller 42 effectively operates as a brake, and the mill reduction operation per se may also effectively operate as a brake, upon the lower surface of the sheet workpiece 22, that is, the surface disposed in contact with the upper roller 42, while the bottom or lower roller 44 pulls and accelerates the sheet workpiece 22, the roller 44 effectively operating upon the upper surface of the sheet workpiece 22, that is, the surface thereof which is disposed in contact with the roller 44. As the sheet workpiece accelerates through the nip 46 defined between the rollers 42 and 44, it is simultaneously milled and stretched to its final predetermined thickness which may in fact be less than the space dimension of the nip 46 as defined between the rollers 42 and 44. In particular, the thickness of the finished sheet 22 depends upon the lineal surface velocity differential defined between the top roller 42 and the bottom roller 44, that is, the faster the bottom or lower roller 44 rotates relative to the top or upper roller 42, the thinner the finished sheet 22 will be. It is also to be noted that some stretching may occur slightly before or after the nip 46 defined between the rollers 42 and 44 depending, again, upon the surface velocity of the bottom roller 44. Thus, as has been noted hereinabove, there is essentially a zero gap between the milling and stretching functions or operations performed in connection with the sheet workpiece 22 and the processing thereof into the finalized or finished sheet 22. As a result of such simultaneous milling and stretching processing, it has been noted that there is substantially less necking of the sheet width as compared to the parameters of sheets which have undergone stretching methods in accordance with prior art processes or techniques wherein the sheet is stretched only after the milling step has been completed.

After the finished sheet 22 exits from the zero gap assembly 20, it is conducted through the exit bridle assembly 26. The exit bridle assembly 26 may take any one of several different forms, and as shown in FIG. 1, the assembly 26 preferably comprises a plurality of rollers or cylinders 76, 78, 80, 82, 84, and 86 which are mounted by suitable means, such as, for example, shafts or axles, not shown, upon the support 28. The assembly 26, and in particular, the rollers 76–86, are used to pull the finished sheet 22 out from the zero gap assembly 20. The rollers 76, 78, 80, 82, 84, and 86 may be solid or hollow, and more or fewer rollers than those disclosed may be used. The rollers 76, 78, 80, 82, 84, and 86 do not substantially contribute to any stretching of the finished sheet 22, and as seen in FIG. 1, are arranged in two vertically spaced rows with the bottom or lower row rollers 78, 82, and 86 also being spaced between the top or upper row rollers 76, 80, and 84 as considered in the transverse direction. The upper rollers 76, 80, and 84 all rotate in the clockwise direction, while the lower rollers 78, 82, and 86 all rotate in the counterclockwise direction such that the finished sheet 22 can be properly conducted through the exit bridle assembly 32. The rollers 76, 78, 80, 82, 84, and 86 are rotated at a uniform rate of speed by suitable drive means, not shown, such as, for example, a motor and shaft assembly, and the speed of the rollers 76, 78, 80, 82, 84, and 86 is such that the lineal surface velocities thereof are essentially the same as that of the bottom or lower roller 44 of the zero gap assembly 20.

It is to be appreciated, and as will be briefly noted and illustrated hereinafter, that in accordance with further teachings of the present invention, another stretching process and apparatus for implementing the same, such as, for example, a short gap stretching apparatus, system, or assembly, may be used either before or after the zero gap assembly 20 so as to further modify or enhance the characteristics of the finished sheet 22.

Having now disclosed the specifics of the apparatus comprising the present invention, the method to be practiced by means of such apparatus and in accordance with the present invention will now be described. More particularly, the sheet workpiece 22 is fed from the extruding machine 30 to the entry bridle assembly 32 and is wound around the entry bridle assembly rollers 34, 36, 38, and 40 so as to be, in turn, properly conducted into the zero gap assembly 20. The sheet workpiece 20 is then fed around the top or upper roller 42 of the zero gap assembly 20, the top or upper roller 42 of the assembly 20 being driven at the same lineal surface velocity as that of the entry bridle rollers 34, 36, 38, and 40. As the sheet workpiece 22 enters the zero gap assembly 20, it travels around the outer peripheral surface of the top or upper roller 42 until it reaches the nip 46 defined between the top or upper roller 42 and the bottom or lower roller 44. As previously noted, the faster rotating bottom roller 44 pulls the sheet workpiece 22 through the nip 46 while the slower rotating top or upper roller 42, as well as the mill reduction process per se, effectively acts as a brake upon the lower surface of the sheet workpiece 22, that is, the surface of the workpiece 22 which is disposed in contact with the upper or top roller 42. Thus, the sheet 22 accelerates through the nip 46 defined between the rollers 42 and 44, and is simultaneously milled and stretched to its finalized predetermined thickness dimension as the same passes through the nip 46. The exit bridle assembly 26 subsequently pulls the finished sheet 22 off from the bottom or lower roller 44 of the zero gap assembly 20, and it is therefore appreciated that in accordance with the method of the present invention, there is able to be achieved the production of a thin, flat, oriented sheet 22 which is ready to be surface treated and/or heat treated as desired, and sliced into thin straps as required or desired for use in strapping packages and the like in accordance with known procedures.

It is again reiterated that the above-described apparatus and process produce a significantly better quality strap than those able to be formerly produced in accordance with known or prior art apparatus and processes, as also exemplified and illustrated by means of the various data noted in the following table:

TABLE I

|  | SINGLE DRAW PROCESS | ZERO GAP PROCESS |
| --- | --- | --- |
| Tensile Strength (KPSI) | 45 | 64 |
| Elongation (%) | 25 | 13 |
| Modulus (@ 2 & 5 KPSI) | 400 | 963 |
| Weld Strength (Lbs) | 79 | 187 |
| Weld Percent | 55 | 89 |
| Weld Equivalent (KPSI) | 25 | 57 |
| Split (In) | 0.7 | 0.07 |

As can be appreciated from the table noted above, the zero gap method produces strapping which exhibits higher tensile strength, and a stronger and higher percentage weld. Furthermore, splitting of the strapping has been essentially eliminated while still achieving high tensile strength, whereas in accordance with known or prior art manufacturing techniques and processes, as the tensile strength is increased, increased splitting occurs and the percent of weld strength decreases. Still further, since the tensile strength of the strapping produced in accordance with the zero gap process is approximately 1.47 times the tensile strength of conventionally produced strapping, and since the elongation of such strapping of the present invention is approximately one-half that of the conventional strapping, better creep performance of achieved. Such results present several market advantages in connection with polypropylene material straps. More particularly, if the break strength of the strapping is a controlling factor in connection with the particular application or use of the strapping, then the higher tensile strength of the material will permit the use or substitution of a strap which comprises only approximately seventy percent of currently used material or strapping. Similarly, if stiffness is a controlling factor, characteristic, or attribute, the strapping produced in accordance with the present invention is such as to be readily capable of being reliably fed into a strapping machine by being pushed around a guide chute of the strapping machine. Still yet further, if weld strength of the strapping is a controlling factor or characteristic, then strapping comprising less than one-half of the currently or conventionally used raw material will produce the equivalent joint strength.

The various properties resulting from the process of the present invention give significant flexibility of design to the strapping which may then be used in connection with a variety of applications. It is believed, for example, that the strapping produced by means of the process of the present invention exhibits a stronger bond across the grain, while still being relatively easy to tear the strap across the grain. Furthermore, the strap produced by means of the zero gap process of the present invention does not exhibit structual delamination as is often characteristic of most prior art strapping. Since the strap of the present invention does not exhibit structural delamination, higher weld strength is also obtained. As has also been noted hereinbefore, if a prestretch step is performed between the entry bridle assembly and the zero gap assembly, or if a post-stretch step is performed between the zero gap assembly and the exit bridle assembly, the same overall characteristics are achieved as are achieved in accordance with the embodiment of the invention described in connection with the system and process of FIGS. 1–4. It is noted, however, that if a pre-stretch process step is performed upon the sheet workpiece 22, a higher tensile modulus can be achieved, whereas if a post-stretch process step is performed upon the finished sheeting 22, the material comprising the sheeting has a somewhat greater tendency toward fibrillation.

Figure 5:
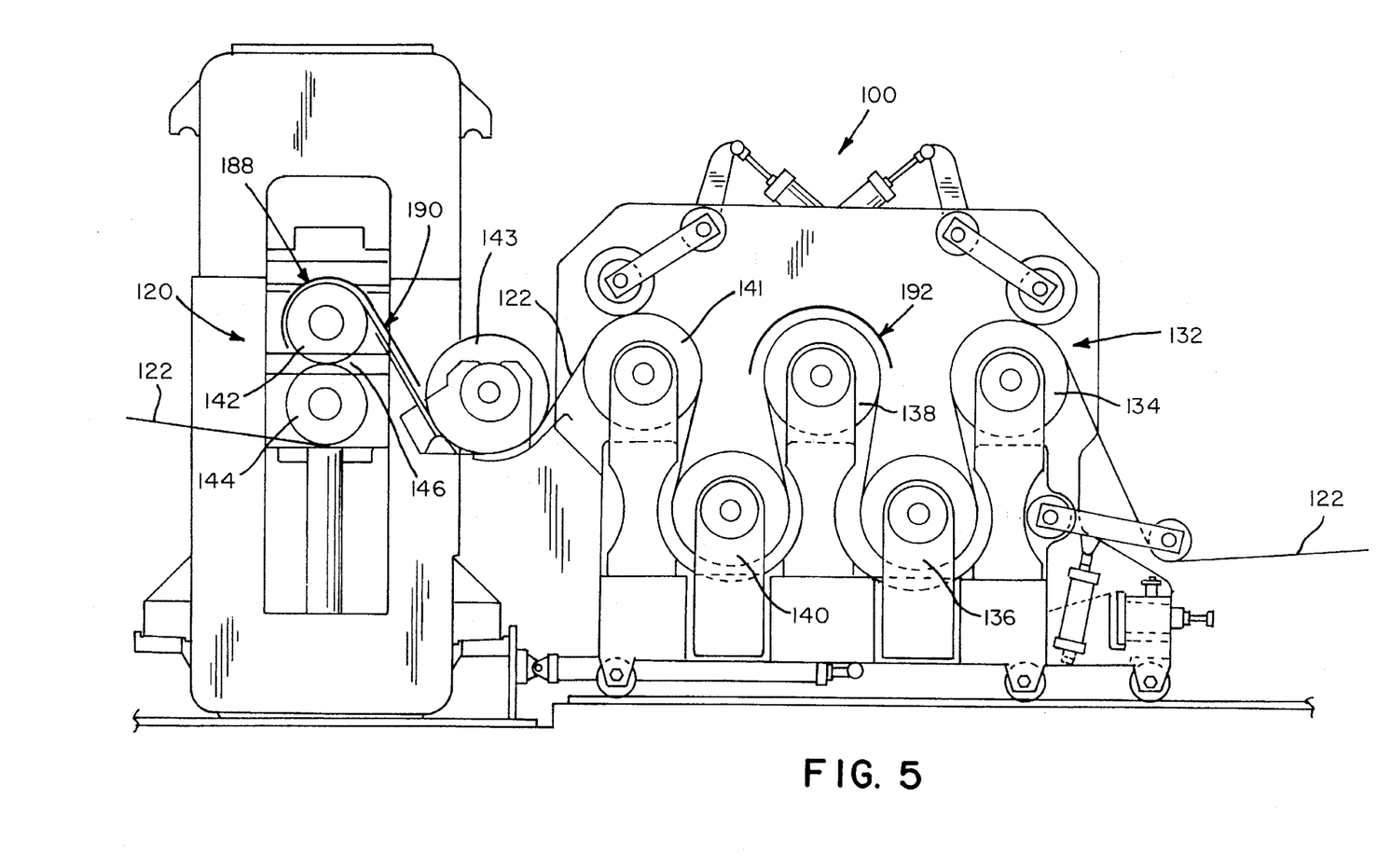
FIG. 5 is a front view of apparatus, constructed in accordance with the present invention and similar to the apparatus shown in FIG. 1, showing, however, a modified embodiment for producing oriented plastic strap in accordance with the zero-gap manufacturing process of the present invention wherein the sheet workpiece has its external surface heated prior to entry into the zero-gap roller assembly, as well as its edge portions heated prior to entry into the nip defined between the milling and stretching rollers of the zero-gap roller assembly.

With reference again being made to the apparatus or system of FIG. 1, it has been discovered that when the sheet workpiece 22 is conducted through the entry bridle assembly 32, and particularly as the workpiece 22 approaches the upper milling and stretching roller 42 of the zero gap assembly 20, the upper or outer surface of the sheet workpiece 22, that is, the surface thereof which is not disposed in contact with the peripheral surface of the upper or top roller 42 of the zero gap assembly 20, will tend to cool at a faster rate than the lower or inner surface of the sheet workpiece 22 which is disposed in contact with the peripheral surface of the upper or top roller 42 of the zero gap assembly 20 in view of the fact that the upper or outer surface of the sheet workpiece 22 is exposed directly to the ambient air. As a result of such uneven or unequal cooling of the surfaces, or as a result of the development of such a temperature differential between the noted surfaces of the sheet workpiece 22, the sheet workpiece 22 exhibits density differentials throughout the thickness thereof whereby such density differentials adversely affect some of the properties or characteristics of the sheet workpiece. Consequently, in order to rectify, resolve, or eliminate such problem, an improved system or apparatus, generally indicated by the reference character 100, has been developed and is shown in FIG. 5. The apparatus 100 is seen to comprise an entry bridle assembly 132 similar to the entry bridle assembly 32 of the embodiment of FIG. 1, and similarly, there is disclosed a zero gap assembly 120 which is similar to the zero gap assembly 20 of the embodiment of FIG. 1 and is seen to comprise upper and lower milling and stretching rollers 142 and 144, respectively. The entry bridle assembly 132 is seen to comprise rollers 134, 136, 138, 140, and 141, all of which are heated to an operative temperature of approximately 265° F. The upper or top roller 142 of the zero gap assembly 120 is heated to a temperature of approximately 290° F., and the lower or bottom roller 144 of the zero gap assembly 120 is heated to a temperature of approximately 250° F. In accordance with this embodiment of the present invention, in order to maintain the outer surface of the sheet workpiece 122, that is, the surface of the sheet workpiece 122 which is not disposed in contact with the peripheral or circumferential surface of the upper or top roller 142 of the zero gap assembly 120, at a temperature level which is substantially equal to the temperature level of the inner surface of the sheet workpiece 122, that is, the surface of the sheet workpiece 122 which is disposed in contact with the peripheral or circumferential surface of the upper or top roller 142 of the zero gap assembly 120, an additional heated roller 143 is interposed between the last roller 141 of the entry bridle assembly 132 and the upper or top roller 142 of the zero gap assembly 120. Roller 143 is heated to an operative temperature of approximately 280° F., and accordingly, it is noted that while the surface temperature of the sheet workpiece 122 at a location just prior to entry into the entry bridle assembly 132, that is, at a position just immediately upstream of the first entry bridle assembly roller 134, is approximately 65° F., the surface temperature of the sheet workpiece 122 at a location immediately downstream of the entry bridle assembly 132 or, in other words, at the location interposed between the last entry bridle assembly roller 141 and the additional heated roller 143, is approximately 219° F., the sheet workpiece 122 obviously having been substantially heated by means of the heated entry bridle assembly rollers 134, 136, 138, 140, and 141. As a result of the further routing of the sheet workpiece 122 about the outer peripheral or circumferential surface of the additional heated roller 143, the outer surface of the sheet workpiece 122, that is, the surface of the sheet workpiece 122 which will not be disposed in contact with the upper or top roller 142 of the zero gap assembly 120, is heated still further such that at a location interposed between the additional heated roller 143 and the upper or top roller 142 of the zero gap assembly 120, the temperature of the outer surface of the sheet workpiece 122 is approximately 242° F. This is somewhat higher than the temperature of the opposite or inner surface of the sheet workpiece 122 which was not directly heated by means of the additional heated roller 143, however, when the inner surface of the sheet workpiece 122 comes into contact with the upper or top roller 142 of the zero gap assembly 120, such inner surface will be heated further. In addition, the outer surface of the sheet workpiece 122 tends to cool due to the fact that such surface is not disposed in contact with the heated, upper or top roller 142 of the zero gap assembly 120 and that such surface is exposed to the ambient air, Consequently, at a location which is immediately upstream of the nip 146 defined between the upper and lower rollers 142 and 144, respectively, of the zero gap assembly 120, both surfaces of the sheet workpiece 122 will have approximately the same temperature which is approximately 236° F. In this manner, the density of the material comprising the sheet workpiece 122 is substantially uniform across the thickness dimension of the sheet workpiece 122 whereby optimum properties can be achieved in the finished sheet 122 which has by such time been simultaneously milled and stretched as a result of being passed through the nip 146 defined between the zero gap assembly rollers 142 and 144. It is to be further noted that the outer surface of the finished sheet 122 which has just emerged from the nip 146 defined between the rollers 142 and 144, that is, the surface of the finished sheet 122 which is not disposed in contact with the lower or bottom roller 144 has a temperature of approximately 290° F., the sheet 122 having experienced such a dramatic increase in its temperature due to the working of the same within the zero gap assembly 120 and having undergone simultaneous milling and stretching within the zero gap assembly 120. After being routed around the outer peripheral or circumferential surface of the lower or bottom roller 144 of the zero gap assembly 120, the finished sheet 122 is conducted downstream for further processing thereof into elongated packaging straps, and at this location, the sheet 122 may exhibit a surface temperature of approximately 277° F.

It is to be emphasized that the importance of the provision of the additional heated roller 143 is to, in effect, "overheat" the outer surface of the sheet workpiece 122 with respect to the inner surface of the sheet workpiece 122 to such a degree that such "overheating" will compensate for the fact that such outer surface of the sheet workpiece 122 will not be otherwise heated as will the inner surface of the sheet workpiece 122 when the same is disposed in contact with the heated upper roller 142 of the zero gap assembly 120, and that such outer surface of the sheet workpiece 122 will experience cooling thereof, which the inner surface of the sheet workpiece 122 will not, due to the fact that the outer surface of the sheet workpiece 122 is exposed to the ambient air whereas the inner surface of the sheet workpiece 122 is not exposed to the ambient air due to its surface contact with the outer peripheral surface of the upper roller 142 of the zero gap assembly 120. In view of these factors, both surfaces will therefore exhibit substantially the same surface temperatures at a point immediately upstream of the nip 146 defined between the zero gap assembly rollers 142 and 144 whereby the improved density profile across or throughout the thickness of the sheet workpiece 122, and the resultant properties derived from or dependent upon such uniform density profile, are able to be achieved.

Continuing further, it is known that during processing of the sheet workpiece 122, that is, by means of the aforenoted milling and stretching thereof, the side edge portions of the sheet workpiece 122 will tend to be thicker than the more centrally located portions of the sheet workpiece 122. The reason for this is that as the sheet workpiece 122 is elongated in its longitudinal direction, the width and thickness dimensions thereof are accordingly reduced with respect to the width and thickness dimensions of the original, non-worked, cast sheet workpiece 122. In addition, the different regions of the sheet workpiece 122 will act differently with respect to each other thereby leading to the differences in the thickness dimensions of the edge regions or portions of the sheet workpiece 122 and of the central portions or regions of the sheet workpiece 122. For example, if the sheet workpiece 122 was divided across its width dimension into equal small regions, it would be appreciated that the central regions would be laterally confined or restrained by neighboring regions upon opposite sides thereof, whereas within the edge regions of the sheet workpiece, such regions are only confined or restrained in one lateral direction or upon one side thereof because the opposite side comprises a free edge or side. In a similar manner, the upper and lower surfaces of the sheet workpiece are not confined or restrained, and this is true for both the central and edge portions or regions of the sheet workpiece. Consequently, when the sheet workpiece undergoes elongation, the central regions of the sheet workpiece cannot be reduced in width as much as the edge regions or portions because of the additional lateral constraints or confinements imposed upon the central regions or portions, however, in order that each region or portion retain its original volumetric value, even though the volumetric configuration of a particular region or portion may be reorganized or rearranged, the thickness dimension of the central regions or portions is reduced to a greater extent than the thickness dimension of the edge portions or regions, or alternatively, the thickness dimension of the edge regions or portions is greater than the thickness dimension of the central regions of the sheet workpiece. When the sheet workpieces used in connection with the present invention usually have a width dimension of approximately twenty-four inches (24") after being simultaneously milled and stretched within the zero gap assembly 120, it has been found that the thicker edge portions occur upon the opposite sides of the oriented or finished sheet 122 for a lateral or widthwise extent of approximately one and one-half inches (1½").

In accordance with one of the objectives Of the present invention, it is desired to effectively reduce the lateral or widthwise extent of the thickened side edge portions or regions of the finished oriented sheet 122, and it has been found that if the side edge portions of the sheet workpiece 122 were heated prior to the entry of the sheet workpiece 122 into the nip 146 defined between the zero gap assembly rollers 142 and 144, the lateral or widthwise extent of the thickened side edge portions or regions of the finished oriented sheet 122 could be dramatically reduced whereby a substantially increased volume of the finished oriented sheet 122, having a desired, uniform thickness or degree of flatness, could, be achieved. In particular, it has been found that the lateral or widthwise extent of each thickened side edge portion or region of the finished oriented sheet 122 can be significantly reduced from the aforenoted one and one-half inches (1½") to approximately one half inch (½"). This reduction in the lateral or widthwise extent of the thickened side edge regions or portions of the finished oriented sheet 122 thus results in less waste or trim to be removed from the finished oriented sheet 122 and concomitantly results in a larger amount or volume of finished oriented sheet 122 which may then be processed into strapping material.

Briefly, as best understood, one reason that the aforenoted heating of the side edge portions of the sheet workpiece prior to entry into the nip region 146 defined between the zero gap assembly rollers 142 and 144 would result in the reduction of the widthwise or lateral extent of the thickened side edge portions of the finished oriented sheet 122 is that within the sheet workpiece, tensile forces or loads act inwardly toward the central region of the sheet workpiece, and the ability to resist tensile loads is a function of temperature. Consequently, when you heat the side edge portions of the sheet workpiece 122, the resistance to the tensile loads is decreased within those regions or portions whereby such outer or side edge portions or regions tend to expand in the lateral or widthwise direction such that the side edge portions or regions of the finished oriented sheet 122 tend to become thinner with a somewhat corresponding increase in the overall width of the finished oriented sheet 122 as compared to a similarly finished, oriented sheet 122 which was not pre-heated within the side edge portions or regions thereof. With reference therefore again being made to FIG. 5, it is seen that in accordance with the principles of the present invention, and furthermore, in accordance with the foregoing discussion, the apparatus or system 100 has incorporated therein radiant, infrared heaters which are adapted to preheat the edge portions of the sheet workpiece 122 prior to its entry into the nip 146 defined between the upper and lower zero gap assembly rollers 142 and 144. In particular, a pair of heaters 188 are effectively disposed with respect to the upper zero gap assembly roller 142 so as to envelop the same for an arcuate or circumferential extent of 180°, and the heaters 188 are also axially disposed along the axis of the roller 142 so as to be optimally positioned with respect to the oppositely disposed edge portions of the sheet workpiece 122. Each of the heaters 188 is approximately two and one-half inches (2½") wide and is operated at 240 VAC with a generated power of 2500 Watts. In addition, a second pair of heaters 190, which are linear in configuration, are operatively connected to the upstream end of the heaters 188, respectively, as viewed in the direction of travel of the sheet workpiece 122 toward the zero gap assembly 120. These heaters 190 are similarly two and one-half inches (2½") wide, however, they may only need to generate a power of 1900 Watts at 240 VAC. Still further, as yet an additional option or alternative, the sheet workpiece 122 may be initially preheated within the entry bridle assembly 132 by means of the disposition of additional heaters 192 which are similar to the heaters 188 in that they have the arcuate configuration enveloping, for example, the upper entry bridle assembly roller 138 over a circumferential extent of 180°, however, such heaters 192 need only generate 1500 Watts power at 240 VAC, and are of the same width.

Figure 6:
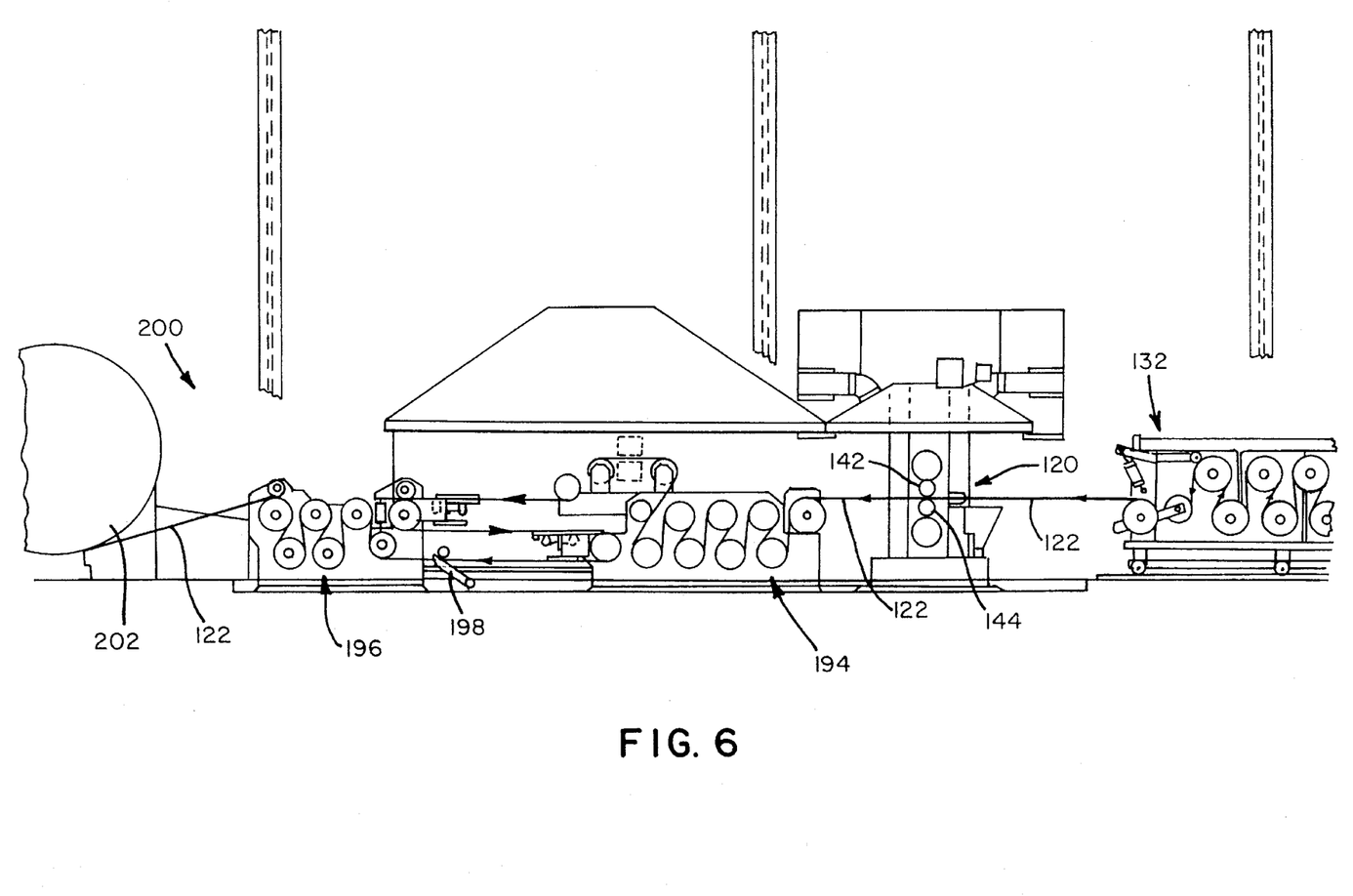
FIG. 6 is a schematic drawing of the processing line used in conjunction with the zero-gap milling and stretching roller assembly wherein trimming apparatus is utilized to trim the thickened edge portions of the milled and stretched strap prior to rolling of the finished strap onto storage rolls.

With reference now being made to FIG. 6, once the sheet workpiece 122 has been milled and stretched within the zero gap assembly 120, and when the side edge portions thereof have been preheated in accordance with the foregoing discussion and disclosures of the heaters 188, 190, and 192, the finished sheet 122 is conducted through an exit bridle assembly generally indicated by the reference character 194 and a flame treat bridle assembly 196 which is conventional. As has been noted hereinbefore in connection with the system of FIG. 1, the lineal surface velocity of each entry bridle assembly roller 34, 36, 38, and 40 is essentially the same as that of the upper roller 42 of the zero gap assembly, and the lineal surface velocity of each exit bridle assembly roller 76, 78, 80, 82, 84, and 86 is essentially the same as that of the lower roller 44 of the zero gap assembly 20, and the lineal surface velocity of the lower roller 44 of the zero gap assembly 20 is within the range of 7–12 times as fast as the lineal surface velocity of the upper roller 42 of the zero gap assembly 20, with a lineal surface ratio of approximately 9.5 being preferred. As an alternative to the foregoing, however, the exit bridle assembly 194 rollers may be operated at a lineal surface velocity which is greater than the lineal surface velocity of the lower zero gap assembly roller 144 by an amount which is within the range of two percent (2%) to twenty per cent (20%). It is to be noted that tensile strength increases with a corresponding increase in exit draw, the width of the finished sheet correspondingly decreases, however, the finished sheet becomes more split sensitive. Consequently, the exit draw values must be chosen or selected from an optimum balance of properties point of view, and accordingly, it has been found that an exit draw value of two percent (2%) to ten per cent (10%) is quite satisfactory.

With reference still being made to FIG. 6, and in accordance with further processing of the finished sheet 122, edge trim knives 198 are located within the processing line at a position interposed between the exit bridle assembly 194 and the flame treat bridle assembly 196. The edge trim knives 198 serve to trim the thickened edge portions of the finished sheet 122 such that the trimmed edge portions of the finished sheet 122 are then removed from the processing line as at 200 while the trimmed finished sheet 122 is then conducted onto storage rolls 202 for subsequent use in actually fabricating thermoplastic strapping.

In accordance with the foregoing, edge heating techniques have been described in connection with the fabrication of finished sheets 122 which exhibit increased degrees of flatness or an increase amount of uniformly flat finished sheet across the width dimension whereby a correspondingly increased amount of strapping can be produced from such finished sheet 122. Increased flatness or increased amounts of uniformly flat finished sheets across the width dimensions thereof can also be achieved in accordance with other manufacturing techniques. For example, with reference being made to FIGS. 7A and 7B, there is shown, in effect, front view profiles of two differently contoured mill rollers which may be incorporated within the zero gap assembly 20 of the system of FIG. 1 or the zero gap assembly 120 of the system of FIG. 5. As can be appreciated from the contoured mill rollers 204 and 206 of FIGS. 7A and 7B, respectively, the central portions of the rollers 204 and 206 are effectively concave as shown at 208 and 209, respectively, while the lateral side edge portions 211 and 213 have straight or horizontal configurations or contours. In this manner, when the sheet workpiece 22 or 122 is milled and stretched within the nip 46 or 146, the edge portions of the sheet workpiece 22 or 122 will be worked to a greater degree than the central portions of the sheet workpiece 22 or 122 whereby the edge portions of the sheet workpiece 22 or 122 will be rendered thinner. Upon being processed within the nip 46 or 146, the edge portions of the sheet workpiece will also undergo thickening to some extent as described hereinbefore, whereby the finalized edge regions of the sheet workpiece or finished sheet 22 or 122 will have the desired degree of thinness and uniformity of flatness as may be similarly achieved by means of the aforenoted edge heating techniques. As can be further appreciated from FIGS. 7A and 7B, the primary difference between the contours or configurations of the mill rollers 204 and 206 resides in the fact that in the case of the roller 204 of FIG. 7A, the central portion thereof has a cylindrical contour as at 215 while the adjacent axial portions thereof have tapered or frustoconical configurations as at 217. Finally, the outermost end or edge portions are cylindrical as at 219, the diametrical extent of cylindrical portions 219 being, however, greater than the diametrical extent of central cylindrical portion 215. Similarly, in the case of the roller 206 of FIG. 7B, the central portion 209 has a concave arcuate configuration while the outermost end portions 221 are cylindrical and have diametrical extents greater than the central portion 209.

Figure 8A:
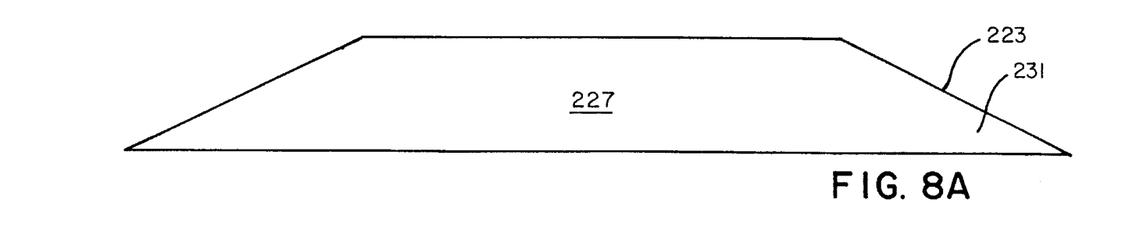
FIGS. 8A and 8B are diagrammatic cross-sectional views of extrusion dies which can be used to produce a sheet workpiece having thinner edge portions such that the amount of useable sheeting exhibiting the desired degree of flatness, as viewed in the transverse direction across the width of the sheeting, when the sheeting is milled and stretched, is enhanced.
Figure 8B:
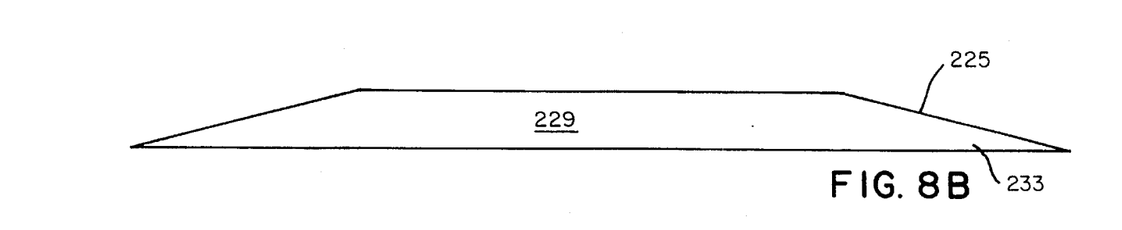
Figure 9:
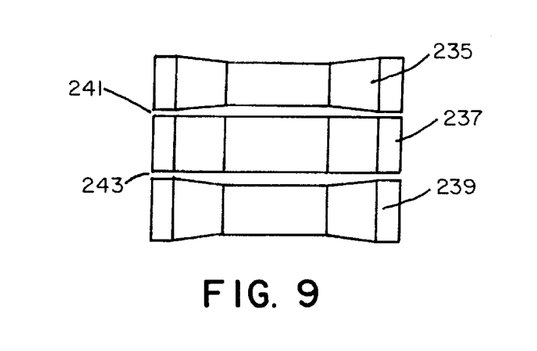
FIG. 9 is a front view of casting rolls used in conjunction with the extrusion dies of FIGS. 8A and 8B for casting and further forming the sheet workpiece extruded from the extrusion dies of FIGS. 8A and 8B such that the sheet workpiece can be conducted downstream toward the zero-gap milling and stretching assembly.

With reference lastly being made to FIGS. 8A, 8B, and 9, another manufacturing technique which may be employed in order to achieve increased flatness or increased amounts of uniformly flat finished sheets across the width dimensions thereof involves the extrusion of the sheet workpieces 22 or 122 from particularly configured extrusion dies 223 and 225 which are respectively shown in FIGS. 8A and 8B. As can be appreciated, each of the dies 223 and 225 has, in effect, a die mouth 227 and 229 which has a trapezoidal configuration which therefore produces sheet workpieces 22 and 122 which likewise have trapezoidal cross-sectional configurations, or in other words, the edge portions 231 and 233 will be substantially thinner than the central portions of the sheet workpieces 22 and 122. In this manner, when these trapezoidal configured sheet workpieces 22 and 122 are milled and stretched, their edge portions will tend to thicken somewhat whereby the resulting edge portions will have thickness dimensions substantially the same as the central portions of the sheet workpieces 22 and 122 such that a substantially uniform thickness dimension is achieved across substantially the entire width of the sheet workpieces 22 or 122 except of course in the outermost edge regions as has been noted hereinbefore. It will be further appreciated that the only significant difference between the dies 223 and 225 is that die 223 produces a sheet workpiece 22 or 122 which has a greater thickness dimension than a similar workpiece 22 or 122 that may be produced by means of die 225. In FIG. 9, a set of casting rollers 235, 237, and 239 are disclosed as being arranged in a vertical array. The upper and lower rollers 235 and 239 each have configurations somewhat similar to those of mill rollers 204 and 206, while the central casting roller 237 has a cylindrical configuration. Consequently, it can appreciated that the spaces 241 and 243 defined respectively between the casting rollers 235 and 237, and 237 and 239, have, in effect, trapezoidal configurations such that when the sheet workpieces 22 or 122 are extruded from the die mouths 227 or 229, the workpiece 22 or 122 is initially routed about the casting rollers so as to be inserted into the space 241, wrapped about the roller 237, and withdrawn from space 243. Consequently, it is seen that the trapezoidal configuration of space 243 is, in effect, upside-down with respect to the trapezoidal configuration of space 241. The sheet workpiece 22 or 122 may then be conveyed further toward the zero gap assembly 20 or 120 for processing in accordance with the techniques of the present invention.

Thus, it may be seen that in accordance with the foregoing, and particularly the manufacturing techniques and apparatus developed in accordance with the principles of the present invention, the finished milled and stretched sheets exhibit improved density, and therefore operative or field use, properties, and in addition, the sheets also exhibit improved degrees or uniformity of flatness whereby increased volumes of thermoplastic strapping may be produced or derived therefrom.

Obviously, many modifications and alterations may be derived or developed in light of the above teachings. It is therefore to be understood that within the scope of the appended claims, the present invention may be practiced otherwise than as specifically described herein.

What is claimed as new and desired to be protected by means of Letters Patent of the United States of America, is:

1. A method for simultaneously milling and stretching a sheet workpiece which travels in a predetermined direction, comprising the steps of:

providing a pair of opposed rollers defining a nip therebetween for simultaneously milling and stretching said sheet workpiece as said sheet workpiece is passed through said nip in a single pass;

driving said opposed rollers in opposite directions and at sufficiently different lineal surface velocities for simultaneously milling and stretching said sheet workpiece within said nip defined between said pair of opposed rollers; and heating an outer surface portion of said sheet workpiece, which is not disposed in contact with a first, upstream one of said pair of opposed rollers, as considered in said direction of travel, at a location upstream of said nip defined between said pair of opposed rollers and to a temperature level which is greater than the temperature level of an inner surface portion of said sheet workpiece which is disposed in contact with said first, upstream one of said pair of opposed rollers, such that when said outer and inner surface portions of said sheet workpiece reach said nip defined between said pair of opposed rollers, said temperature levels of said inner and outer surface portions of said sheet workpiece will be substantially the same whereby the density of said sheet workpiece across the thickness dimension of said sheet workpiece will be substantially uniform.

2. The method as set forth in claim 1, wherein:

a downstream one of said pair of opposed rollers is rotated at a lineal surface velocity which is within the range of 7–12 times greater than the lineal surface velocity of said upstream one of said pair of opposed rollers.

3. A method for simultaneously milling and stretching a sheet workpiece which travels in a predetermined direction, comprising the steps of:

providing a pair of opposed rollers defining a nip therebetween for simultaneously milling and stretching said sheet workpiece as said sheet workpiece is passed through said nip in a single pass;

driving said opposed rollers in opposite directions and at sufficiently different lineal surface velocities for simultaneously milling and stretching said sheet workpiece within said nip defined between said pair of opposed rollers; and heating opposite edge portions of said sheet workpiece at a location upstream of said nip defined between said pair of opposed rollers so as to increase the degree of flatness of said simultaneously milled and stretched sheet workpiece across the width of said simultaneously milled and stretched sheet workpiece after said simultaneously milled and stretched sheet workpiece has passed through said nip defined between said pair of opposed rollers.

4. A method as set forth in claim 1, wherein:

said heating of said outer surface portion of said sheet workpiece occurs at a location upstream of said pair of opposed rollers.

5. A method as set forth in claim 1, further comprising the step of:

providing an entry bridle assembly; and said heating of said outer surface portion of said sheet workpiece occurs at a location interposed between said entry bridle assembly and said pair of opposed rollers.

6. A method as set forth in claims 3, wherein:

said heating of said opposite edge portions of said sheet workpiece occurs while said sheet workpiece is routed about an upstream one of said opposed rollers.

7. A method as set forth in claim 3, further comprising:

providing an entry bridle assembly comprising bridle rollers;

said heating of said opposite edge portions of said sheet workpiece occurs while said sheet workpiece is routed about one of said bridle rollers of said entry bridle assembly.

8. A method for simultaneously milling and stretching a sheet workpiece which travels in a predetermined direction, comprising the steps of:

providing a pair of opposed rollers having a configuration comprising concave central portions and cylindrical edge portions and defining a nip therebetween through which said sheet workpiece is passed so as to be simultaneously milled and stretched as said sheet workpiece passes through said nip in a single pass; and driving said opposed rollers in opposite directions and at sufficiently different lineal surface velocities for simultaneously milling and stretching said sheet workpiece within said nip defined between said pair of opposed rollers and for providing said sheet workpiece with thinner edge portions than central portions as said sheet workpiece is conducted through said nip defined between said pair of opposed rollers such that an increased degree of flatness of said simultaneously milled and stretched sheet workpiece across the width of said simultaneously milled and stretched sheet workpiece after said simultaneously milled and stretched sheet workpiece has passed through said nip defined between said pair of opposed rollers is achieved.

9. A method for simultaneously milling and stretching a sheet workpiece which travels in a predetermined direction, comprising the steps of:

providing die means, having a predetermined cross-sectional configuration, for extruding a sheet workpiece such that said extruded sheet workpiece has thinner edge portions than central portions;

providing a pair of opposed rollers defining a nip therebetween for simultaneously milling and stretching said sheet workpiece as said sheet workpiece is passed through said nip in a single pass; and driving said opposed rollers in opposite directions and at sufficiently different lineal surface velocities for simultaneously milling and stretching said sheet workpiece within said nip defined between said pair of opposed rollers such that an increased degree of flatness of said simultaneously milled and stretched sheet workpiece across the width of said simultaneously milled and stretched sheet workpiece after said simultaneously milled and stretched sheet workpiece has passed through said nip defined between said pair of opposed rollers is achieved.

10. The method as set forth in claim 1, wherein:

said outer surface portion of said sheet workpiece is heated at a location which is upstream of said first, upstream one of said pair of opposed rollers, as considered in said direction of travel of said sheet workpiece.

11. The method as set forth in claim 10, further comprising the step of:

providing an entry bridle assembly upstream of said pair of opposed rollers, as considered in said direction of travel of said sheet workpiece; and said outer surface portion of said sheet workpiece is heated at a location which is interposed between said entry bridle assembly and said upstream one of said pair of opposed rollers.

12. The method as set forth in claim 11, further comprising the step of:

providing a heated roller at said location interposed between said entry bridle assembly and said upstream one of said pair of rollers for heating said outer surface portion of said sheet workpiece to said greater temperature level.

13. The method as set forth in claim 12, further comprising the step of:

heating said heated roller to a temperature level of approximately 280° F. so as to, in turn, heat said outer surface of said sheet workpiece to a temperature level of approximately 242° F.

14. The method as set forth in claim 13, further comprising the step of:

heating said first upstream one of said pair of opposed rollers to a temperature level of approximately 290° F. so as to, in turn, heat said inner surface portion of said sheet workpiece such that both said outer and inner surface portions of said sheet workpiece will have substantially the same temperature level of approximately 236° F. at a location immediately upstream of said nip defined between said pair of opposed rollers.

15. The method as set forth in claim 6, further comprising the steps of:

providing an entry bridle assembly comprising entry bridle rollers; and said heating of said opposite edge portions of said sheet workpiece occurs along a linear extent of said sheet workpiece, which is formed between said entry bridle assembly and said upstream one of said pair of opposed rollers, in addition to said heating of said opposite edge portions of said sheet workpiece as said sheet workpiece is routed about said upstream one of said opposed rollers.

16. The method as set forth in claim 15, wherein:

said heating of said opposite edge portions of said sheet workpiece is performed by radiant, infrared heaters.

17. The method as set forth in claim 16, wherein:

said radiant, infrared heaters are provided with a linear portion for heating said linear extent of said sheet workpiece, and an arcuate portion having a circumferential extent of approximately 180° for heating said opposite edge portions of said sheet workpiece routed about said upstream one of said opposed rollers.

18. The method as set forth in claim 16, further comprising the step of:

providing said infrared heaters with a widthwise extent of two and one-half inches (2.5") so as to be properly disposed in an overlying manner with respect to said side edge portions of said sheet workpiece.

19. The method as set forth in claim 7, wherein:

said heating of said opposite edge portions of said sheet workpiece is performed by radiant, infrared heaters.

20. The method as set forth in claim 19, wherein:

said radiant, infrared heaters are provided with an arcuate configuration having a circumferential extent of approximately 180° for heating said opposite edge portions of said sheet workpiece routed about said one of said bridle assembly rollers.

21. The method as set forth in claim 8, wherein:

a downstream one of said pair of opposed rollers, as considered in said predetermined direction of travel of said sheet workpiece, is rotated at a lineal surface velocity which is within the range of 7–12 times greater than the lineal surface velocity of an upstream one of said pair of opposed rollers.

22. The method as set forth in claim 9, wherein:

said die means is provided with a trapezoidal configuration such that opposite side edge portions of said extruded sheet workpiece are tapered laterally outwardly so as to define said thinner edge portions.

23. The method as set forth in claim 9, wherein:

a downstream one of said pair of opposed rollers, as considered in said predetermined direction of travel of said sheet workpiece, is rotated at a lineal surface velocity which is within the range of 7–12 times greater than the lineal surface velocity of an upstream one of said pair of opposed rollers.

24. The method as set forth in claim 2, wherein:

said lineal surface velocity of said downstream one of said pair of opposed rollers is 9.5 times said lineal surface velocity of said upstream one of said pair of opposed rollers.

25. The method as set forth in claim 21, wherein:

said lineal surface velocity of said downstream one of said pair of opposed rollers is 9.5 times said lineal surface velocity of said upstream one of said pair of opposed rollers.

26. The method as set forth in claim 23, wherein:

said lineal surface velocity of said downstream one of said pair of opposed rollers is 9.5 times said lineal surface velocity of said upstream one of said pair of opposed rollers.

27. The method as set forth in claim 3, wherein:

a downstream one of said pair of opposed rollers, as considered in said predetermined direction of travel of said sheet workpiece, is rotated at a lineal surface velocity which is within the range of 7–12 times greater than the lineal surface velocity of an upstream one of said pair of opposed rollers.

28. The method as set forth in claim 27, wherein:

said lineal surface velocity of said downstream one of said pair of opposed rollers is 9.5 times said lineal surface velocity of said upstream one of said pair of opposed rollers.

* * * * *